United States Patent
Kamei et al.

(10) Patent No.: US 12,498,497 B2
(45) Date of Patent: Dec. 16, 2025

(54) METHOD AND APPARATUS FOR FIXED PATTERN NOISE CORRECTION USING NON-CONDUCTIVE STATE MEASUREMENTS

(71) Applicant: CANON KABUSHIKI KAISHA, Tokyo (JP)

(72) Inventors: Satoshi Kamei, Tokyo (JP); Katsuro Takenaka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 319 days.

(21) Appl. No.: 18/317,173

(22) Filed: May 15, 2023

(65) Prior Publication Data

US 2023/0417934 A1 Dec. 28, 2023

(30) Foreign Application Priority Data

Jun. 28, 2022 (JP) ................................ 2022-103906

(51) Int. Cl.
*G01T 1/20* (2006.01)
(52) U.S. Cl.
CPC ................................ *G01T 1/20182* (2020.05)
(58) Field of Classification Search
CPC ......... G01T 1/20182; G01T 1/17; H04N 5/32; H04N 25/672; H04N 25/673
See application file for complete search history.

(56) References Cited

U.S. PATENT DOCUMENTS

| | | |
|---|---|---|
| 9,035,265 B2 | 5/2015 | Yagi et al. |
| 9,417,333 B2 | 8/2016 | Sato et al. |
| 2014/0320685 A1 | 10/2014 | Takenaka et al. |
| 2020/0107791 A1* | 4/2020 | Sawaguchi ............ A61B 6/585 |

FOREIGN PATENT DOCUMENTS

JP 2016-116773 A 6/2016

* cited by examiner

*Primary Examiner* — Edwin C Gunberg
*Assistant Examiner* — Richard O Toohey
(74) *Attorney, Agent, or Firm* — Carter, DeLuca & Farrell LLP (57) ABSTRACT

A radiation imaging apparatus including pixels each including a conversion element and a switch element, a signal line to which signals are supplied from the pixels, a readout circuit reading out a signal supplied to the signal line and a processor processing a signal read out by the readout circuit, is provided. The readout circuit performs, during irradiation with radiation, a first operation of reading out a signal while the switch element of each of the pixels is in a non-conduction state and a second operation of reading out a signal while the switch element of a predetermined pixel of the pixels is in a conduction state. The processor corrects a second signal value of a signal read out by the second operation by using a first signal value of a signal read out by the first operation.

14 Claims, 8 Drawing Sheets

RADIATION IMAGE

RADIATION IMAGE

METHOD AND APPARATUS FOR FIXED PATTERN NOISE CORRECTION USING NON-CONDUCTIVE STATE MEASUREMENTS

BACKGROUND OF THE INVENTION

Field of the Invention

The present invention relates to a radiation imaging apparatus, a radiation imaging system, a control method for the radiation imaging apparatus, a non-transitory computer-readable storage medium, and a signal processing apparatus

Description of the Related Art

In medical image diagnosis and non-destructive inspection, a radiation imaging apparatus using a flat panel detector (FPD) formed from a semiconductor material is widely used. The radiation image obtained by the FPD includes fixed pattern noise (FPN) caused by variations in the capacitances of pixels at the time of manufacturing and the offset variations of a readout circuit. Japanese Patent Laid-Open No. 2016-116773 discloses a technique of accurately correcting FPN.

SUMMARY OF THE INVENTION

A radiation imaging apparatus sometimes obtains data for a radiation image by reading out signals from pixels through signal lines while keeping irradiation with radiation. In reading out signals while keeping irradiation with radiation, when radiation applied fluctuates, the amount of crosstalk noise superimposed on a signal line changes, and striped artifacts appear in a radiation image. FPN correction alone may not be possible to sufficiently cope with the artifacts caused by the fluctuations of radiation applied.

Some embodiments of the present invention provide a technique advantageous in obtaining a radiation image with good image quality when reading out signals while keeping irradiation with radiation.

According to some embodiments, a radiation imaging apparatus comprising a plurality of pixels each including a conversion element configured to convert radiation into signal charge and a switch element configured to output an electrical signal corresponding to the signal charge, a signal line to which signals are supplied from the plurality of pixels, a readout circuit configured to read out a signal supplied to the signal line, and a signal processor configured to process a signal read out by the readout circuit, wherein the readout circuit is configured to perform, during irradiation with radiation, a first operation of reading out a signal while the switch element of each of the plurality of pixels is in a non-conduction state and a second operation of reading out a signal while the switch element of a predetermined pixel of the plurality of pixels is in a conduction state, and the signal processor is configured to correct a second signal value of a signal read out by the second operation by using a first signal value of a signal read out by the first operation, is provided.

According to some other embodiments, a control method for a radiation imaging apparatus including a plurality of pixels each including a conversion element configured to convert radiation into signal charge and a switch element configured to output an electrical signal corresponding to the signal charge and a signal line to which signals are supplied from the plurality of pixels, the method comprising: performing, during irradiation with radiation, a first operation of reading out a signal while the switch element of each of the plurality of pixels is in a non-conduction state and a second operation of reading out a signal while the switch element of a predetermined pixel of the plurality of pixels is in a conduction state, and correcting a second signal value of a signal read out by the second operation by using a first signal value of a signal read out by the first operation, is provided.

According to still other embodiments, a signal processing apparatus that processes a signal output from a radiation imaging apparatus, the radiation imaging apparatus including a plurality of pixels each including a conversion element configured to convert radiation into signal charge and a switch element configured to output an electrical signal corresponding to the signal charge, a signal line to which signals are supplied from the plurality of pixels, and a readout circuit configured to read out a signal supplied to the signal line, wherein the readout circuit is configured to perform, during irradiation with radiation, a first operation of reading out a signal from the signal line while the switch element of each of the plurality of pixels is in a non-conduction state and a second operation of reading out a signal from the signal line while the switch element of a predetermined pixel of the plurality of pixels is in a conduction state, and to output signals read out by the first operation and the second operation, and the signal processing apparatus is configured to obtain the signals read out by the first operation and the second operation and to correct a second signal value of a signal read out by the second operation by using a first signal value of a signal read out by the first operation, is provided.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Radiation according to the disclosure of this specification can include not only α-rays, β-rays, and γ-rays that are beams generated by particles (including photons) emitted by radioactive decay but also beams having energy equal to or higher than the energy of these beams, for example, X-rays, particle rays, and cosmic rays.

Figure 1:
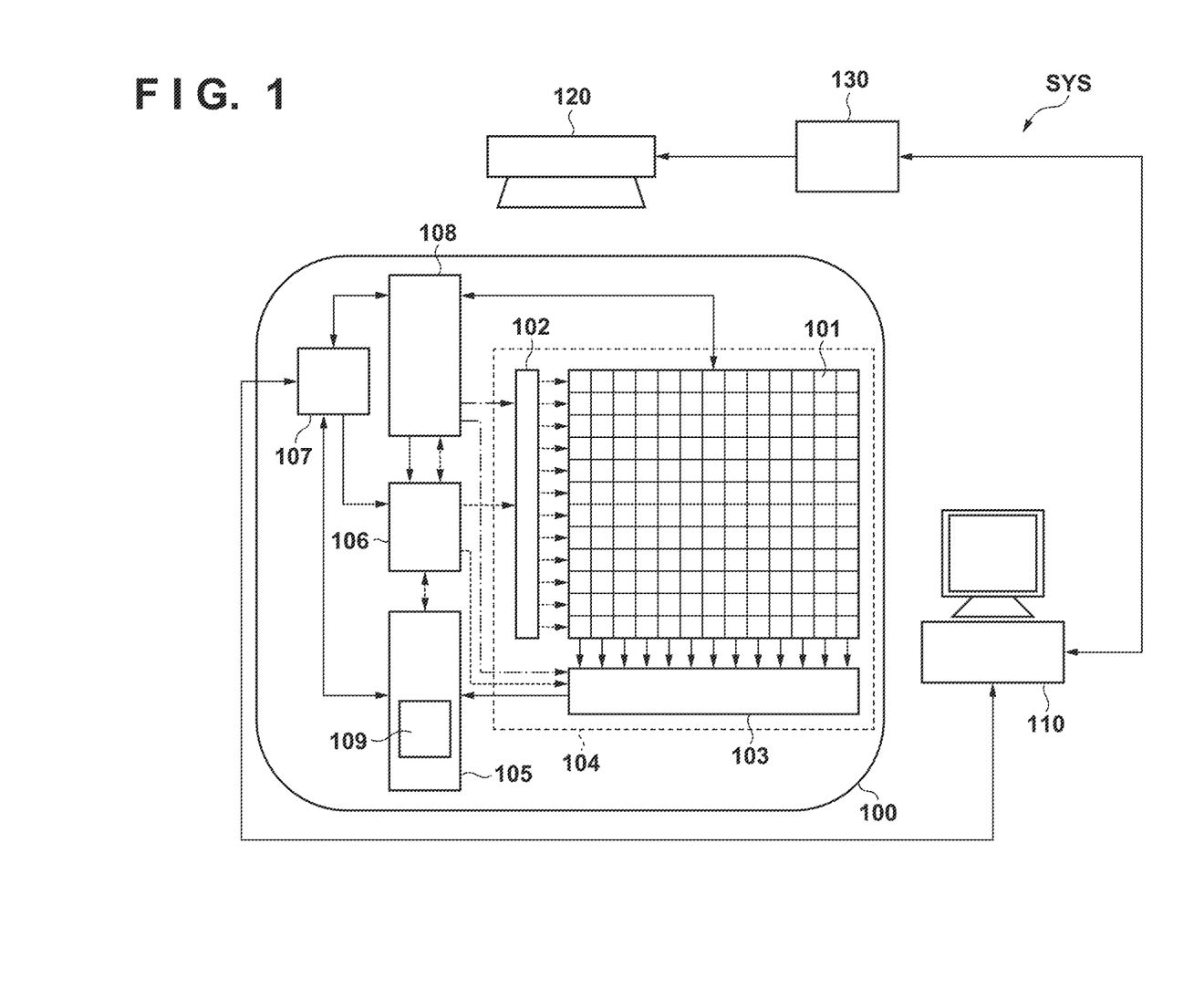
FIG. 1 is a view showing an example of the arrangement of a radiation imaging system using a radiation imaging apparatus according to the disclosure of this specification.

A radiation imaging apparatus according to this embodiment will be described with reference to FIGS. 1 to 9. FIG. 1 is a view showing an example of the arrangement of a radiation imaging system SYS including a radiation imaging apparatus 100 according to the embodiment. As shown in FIG. 1, the radiation imaging system SYS according to the embodiment includes the radiation imaging apparatus 100, a control computer 110, a radiation generator 120, and a radiation controller 130.

The radiation generator 120 emits radiation under the control of the radiation controller 130. The control computer 110 obtains image data for generating a radiation image and performs, for example, synchronization control between the radiation controller 130 and the radiation imaging apparatus 100. The control computer 110 can control the overall radiation imaging system SYS. The control computer 110 may be provided with a display like that shown in FIG. 1 to, for example, display an operation state for the user (operator) or display an obtained radiation image.

The radiation imaging apparatus 100 can include a detection unit 101 in which a plurality of pixels that generate signals corresponding to incident radiation are arranged, a drive circuit 102 that controls the drive of the detection unit 101, a readout circuit 103 that reads out signals from the respective pixels through signal lines to which the signals are supplied from the pixels, a power supply circuit 108 that supplies power to each constituent element of the radiation imaging apparatus 100, and a signal processor 105 that processes the signals read out by the readout circuit 103. In this case, the arrangement including the detection unit 101, the drive circuit 102, and the readout circuit 103 is sometimes called a flat panel detector 104. In the arrangement shown in FIG. 1, the signal processor 105 is arranged in the radiation imaging apparatus 100. However, this is not exhaustive, and the control computer 110 may execute at least part of the processing in the signal processor 105 (to be described below). In addition, for example, the function of the signal processor 105 may be provided as a signal processing apparatus or the like independently of the radiation imaging apparatus 100. In this case, the signal processing apparatus can obtain and process the signal read out by the readout circuit 103 and output from the radiation imaging apparatus 100.

The radiation imaging apparatus 100 can include a control unit 106 and a communication unit 107. The control unit 106 controls constituent elements arranged in the radiation imaging apparatus 100. The communication unit 107 is provided to execute communication between the radiation imaging apparatus 100 and the control computer 110. Communication between the radiation imaging apparatus 100 and the control computer 110 may be wired communication as shown in FIG. 1 or wireless communication.

Figure 2:
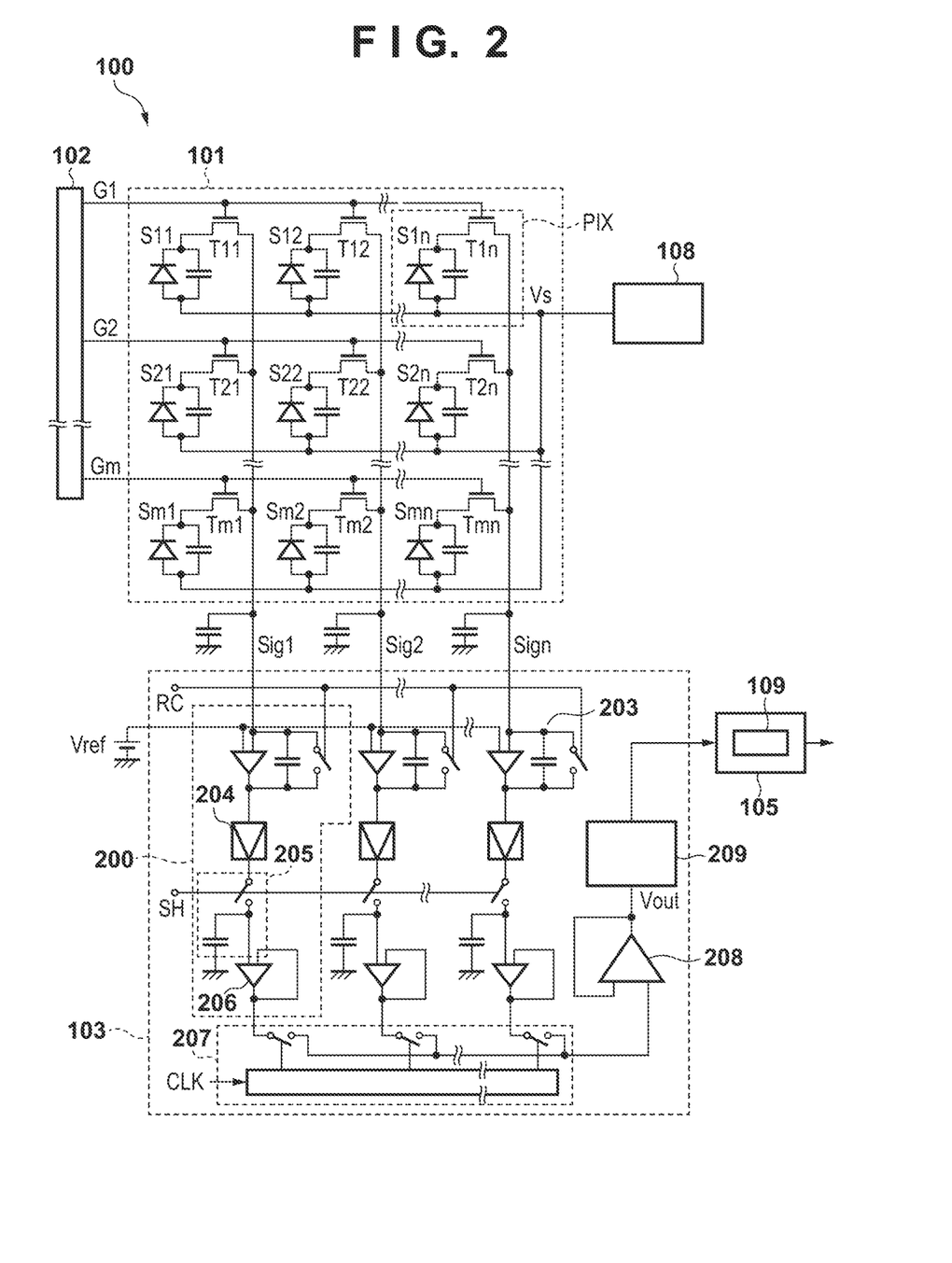
FIG. 2 is a circuit diagram showing an example of the arrangement of a radiation imaging apparatus in FIG. 1.

FIG. 2 is a circuit diagram showing an example of the arrangement of the radiation imaging apparatus 100. FIG. 2 shows nine pixels PIX for the sake of simplicity. However, the actual radiation imaging apparatus 100 includes more pixels PIX. For example, the 17-inch radiation imaging apparatus 100 has the pixels PIX of about 2800 rows×about 2800 columns.

In the detection unit 101, the plurality of pixels PIX are arranged to form rows and columns. Each pixel PIX includes a conversion element S that converts radiation into signal charge and a switch element T that outputs an electrical signal corresponding to the signal charge.

In this embodiment, the conversion element S is a so-called indirect element using a MIS photodiode formed from amorphous silicon as a main material and arranged on a substrate such as a glass substrate and a scintillator that converts radiation into light that can be detected by the MIS photodiode. As the photodiode, a PIN photodiode may be used. As the conversion element S, a direct conversion element that directly converts radiation into charge may be used. As the switch element T, a transistor including a control terminal and two main terminals can be used. In this embodiment, a thin-film transistor (TFT) is used for the switch element T. The switch element T in this embodiment can be a normally-off transistor in which the two main terminals are set in a non-conduction state while a conduction voltage Vcom is not supplied as a drive signal from the drive circuit 102 to the control terminal, and the two main terminals are rendered conductive when the conduction voltage Vcom is supplied as a drive signal from the drive circuit 102 to the control terminal. That is, the switch element T is switched to a conduction state or non-conduction state in accordance with a drive signal supplied to the control terminal. Although described later, while the conduction voltage Vcom is not supplied as a drive signal to the control terminal, a non-conduction voltage Vss can be supplied to the control terminal.

One terminal of the conversion element S is electrically connected to one main terminal of the two main terminals of the switch element T, and the other terminal is electrically connected to the power supply circuit 108 that supplies a bias voltage Vs via a common bias line. A plurality of switch elements T arranged in the row direction (the lateral direction in FIG. 2), for example, the control terminals of switch elements T11 to T1n are commonly electrically connected to a first row drive signal G1. A drive signal that controls the conductive state of the switch element T is supplied from the drive circuit 102 to the switch element T arranged in each pixel PIX for each row via a drive line G. The other main terminal of each of a plurality of switch elements T arranged in the column direction (the vertical direction in FIG. 2), for example, switch elements T11 to Tm1, is electrically connected to a first column signal line Sig1. While the switch element T is in the conduction state, an electrical signal corresponding to the charge of the conversion element S is supplied from the corresponding pixel PIX to a signal line Sig, and the readout circuit 103 reads out the signal supplied to the signal line Sig. A plurality of signal lines Sig1 to Sign are arranged in correspondence with the respective columns of the plurality of pixels PIX, and signals from the pixels PIX, of the plurality of pixels PIX, which are arranged in one row connected to the same drive line G are respectively supplied to the corresponding signal lines Sig1 to Sign. The signal lines Sig1 to Sign transmit the signals output from the plurality of pixels PIX to the readout circuit 103 in parallel.

Amplification circuits 200 that amplify the signals output parallel from the respective pixels PIX of the detection unit 101 are provided in the readout circuit 103 in correspondence with the respective signal lines Sig. Each amplification circuit 200 includes an integrating amplifier 203 that amplifies the signal output from the pixel PIX, a variable amplifier 204 that amplifies the signal output from the integrating amplifier 203, a sample/hold circuit 205 that samples the signal amplified by the variable amplifier 204, and a buffer amplifier 206. The integrating amplifier 203 includes an operational amplifier that amplifies and outputs the signal read out from the pixel PIX, an integrating capacitor, and a reset switch. The integrating amplifier 203 can be configured to change the amplification factor by changing a capacitance value Cf of the integrating capacitor. An output electrical signal is input to the inverting input terminal of the integrating amplifier 203, and a reference voltage Vref is input from the power supply circuit 108 (wire connection from the power supply circuit 108 is not shown in FIG. 2) to the non-inverting input terminal. The amplified electrical signal is then output from the output terminal. An integrating capacitor is arranged between the inverting input terminal and the non-inverting terminal of the operational amplifier. The sample/hold circuit 205 includes a sampling switch and a sampling capacitor. The readout circuit 103 includes a multiplexer 207 that sequentially outputs the electrical signals read out parallel from the respective amplification circuits 200 so as to output an image signal of the serial signal and a buffer amplifier 208 that impedance-converts and outputs the image signal. An A/D converter 209 converts an image signal Vout as an analog electrical signal output from the buffer amplifier 208 into digital image data and outputs it to the signal processor 105.

The drive circuit 102 outputs, as the above drive signal, the conduction voltage Vcom that sets the switch element T in the conduction state or the non-conduction voltage Vss that sets the switch element T in the non-conduction state to each corresponding drive line G in accordance with control signals D-CLK, DIO, and OE input from the control unit 106. The drive circuit 102 controls the conduction state and the non-conduction state of the switch element T to drive the detection unit 101 by using a drive signal. The control signal D-CLK is a shift clock from a shift register used as the drive circuit 102. The control signal DIO is a pulse transferred by the shift register. The control signal OE is a signal that controls the output terminal of the shift register. With the above operation, the time required for driving and a scanning direction are set.

The control unit 106 controls the operation of each constituent element of the readout circuit 103 by supplying control signals RC, SH, and CLK to the readout circuit 103. The control signal RC controls the operation of the reset switch of the integrating amplifier 203. The control signal SH controls the operation of the sample/hold circuit 205. The control signal CLK controls the operation of the multiplexer 207.

The power supply circuit 108 supplies the reference voltage Vref and the bias voltage Vs, which are shown in FIG. 2, and the like. The radiation imaging apparatus 100 supplies power for the above operation to each constituent element of the radiation imaging apparatus 100.

Figure 3:
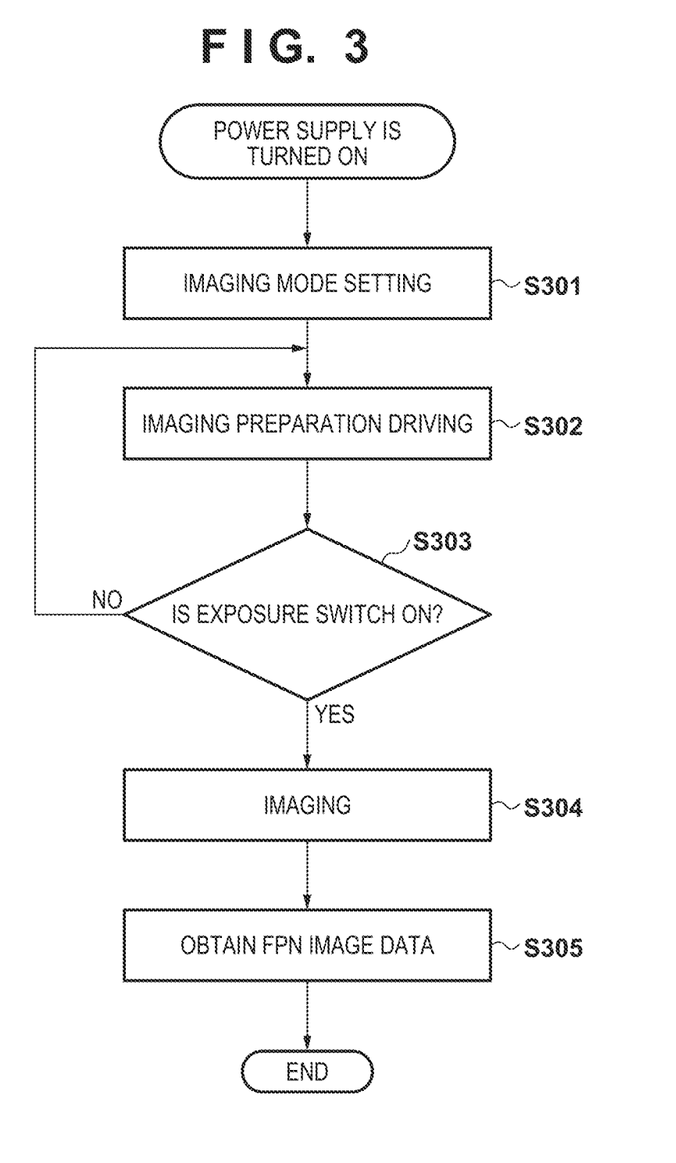
FIG. 3 is a flowchart showing the operation of the radiation imaging apparatus in FIG. 1.

FIG. 3 is a flowchart showing the operation of the radiation imaging apparatus 100 (radiation imaging system SYS). When the radiation imaging apparatus 100 is powered on, the process shifts to step S301. In step S301, first of all, the imaging mode designated by the user using the control computer 110 is transferred from the control computer 110 to the radiation imaging apparatus 100. Driving at the time of imaging, the gain of the amplifier of the readout circuit 103, and the like are determined and mode switching is performed in accordance with the designated imaging mode.

Upon completion of the setting of the imaging mode, the process shifts to step S302 to perform imaging preparation driving.

In imaging preparation driving, the radiation imaging apparatus 100 performs the driving (dummy read) operation of removing charge generated in the conversion element S of the pixel PIX by the accumulation of dark currents. During the imaging preparation driving, the radiation imaging apparatus 100 determines whether the user has depressed the exposure switch to emit radiation (step S303). Before the exposure switch is depressed (NO in step S303), the radiation imaging apparatus 100 repeatedly performs imaging preparation driving. The imaging preparation driving can be regarded as a mode of waiting until the emission of radiation.

When the exposure switch is depressed at a given timing during imaging preparation driving (YES in step S303), the radiation imaging apparatus 100 starts irradiation with radiation and shifts to an imaging state (step S304). Upon completion of imaging, while the emission of radiation is stopped, the radiation imaging apparatus 100 performs the operation of obtaining FPN image data for the correction of fixed pattern noise (FPN) caused by variations in the capacitance of the pixel PIX at the time of manufacturing and the offset variations of the readout circuit 103 (step S305). FPN image data may be obtained between step S302 and step S303.

Assume that after FPN image data is obtained, the next imaging is performed. In this case, when performing imaging in a different imaging mode, the process shifts to step S301, whereas when performing imaging in the same imaging mode, the process shifts to step S302. The imaging operation is ended at the occurrence of an event such as the user issuing an instruction to end imaging or the time passing for a predetermined time without any instruction to perform next imaging after FPN image data is obtained. In addition, for example, the imaging operation may be ended at the occurrence of an event such as an incapability to save data in a storage device (for example, a memory 109 of the signal processor 105) arranged in the radiation imaging apparatus 100, which temporarily stores image data, due to the saturation of the capacity of the storage device.

The drive timing of the radiation imaging apparatus 100 in this embodiment will be described next with reference to FIG. 4. After the power supply is turned on, the radiation imaging apparatus 100 performs the imaging preparation driving (dummy read) operation of removing charge generated in the conversion element S of the pixel PIX due to the accumulation of dark currents. In imaging preparation driving, the radiation imaging apparatus 100 removes charge generated due to the accumulation of dark currents in the conversion element S by sequentially rendering the switch elements T conductive for each row.

When the exposure switch for radiation is depressed, irradiation with radiation is started, and the radiation imaging apparatus 100 starts an imaging operation. In the imaging operation, first of all, the radiation imaging apparatus 100 performs the accumulating operation of accumulating charge generated by the incidence of radiation by rendering the switch elements T in all the rows non-conductive. More specifically, the drive circuit 102 supplies the non-conduction voltage Vss to each of drive lines G1 to Gm to render the switch elements T non-conductive accordingly. In this case, since the readout circuit 103 is not operated during an accumulating operation period, the power supply of the readout circuit 103 may be set in the OFF state for a reduction in power consumption.

When a predetermined time has elapsed since the start of the accumulating operation, a readout operation is executed during irradiation with radiation. In the readout operation, the following two types of operations are performed. The first operation is the operation in which the readout circuit 103 reads out signals while the switch elements T of the plurality of pixels PIX are in the non-conduction state. The first operation is the operation of reading out signals while no signal is supplied from the conversion element S of each of the plurality of pixels PIX to the signal line Sig. That is, as indicated by an operation 411 of reading out signals in FIG. 4, while the non-conduction voltage Vss is supplied as a drive signal to the drive lines G1 to Gm, the readout circuit 103 reads out signals from the signal lines Sig1 to Sign. The second operation is the operation of reading out signals from predetermined pixels of the plurality of pixels PIX by rendering the switch elements T of the predetermined pixels conductive. The second operation is the operation in which while signals are supplied from predetermined pixels of the plurality of pixels PIX to the signal line Sig, the signals are read out. That is, as indicated by an operation 401 in FIG. 4, in this operation (to be sometimes referred to as real read hereinafter), the conduction voltage Vcom is sequentially supplied as a drive signal to each of the drive lines G1 to Gm to read out a signal from each corresponding pixel PIX. As shown in FIG. 4, one image data can be obtained by performing operations 401-1 to 401-$m$ with respect to all the rows set as the range of obtaining a radiation image by sequentially supplying the conduction voltage Vcom to each of the drive lines G1 to Gm from the start row to the end row. However, with the operations 401-1 to 401-$m$ alone, as will be described later, artifacts may appear in the radiation image generated based on obtained image data. For this reason, operations 411-1 to 411-$m$+1 are performed to read out signals. The effect of the operation 411 will be described later. In an imaging operation, the operation 411 as a readout operation may be repeated a plurality of times during irradiation with radiation. For example, each of the operations 411-1 to 411-$m$+1 is performed a plurality of times such that the operation 411-1 is performed a plurality of times, the operation 401-1 can then be performed, and the operation 411-2 is performed a plurality of times.

When the imaging operation is ended, FPN image data is obtained. An operation to be performed when FPN image data is obtained may be similar to an imaging operation. This suppresses a change in noise pattern caused when an imaging operation differs from an operation to obtain FPN image data. Note, however, that no radiation is emitted in an operation to obtain FPN image data. That is, an accumulating operation is started while no radiation is emitted, and a readout operation is then performed. In the readout operation, the radiation imaging apparatus 100 may perform an operation 451 similar to the operation 401 and an operation 461 similar to the operation 411. That is, while the non-conduction voltage Vss is supplied as a drive signal to the drive lines G1 to Gm, the radiation imaging apparatus 100 may repeat the operation 461 of reading out signals from the signal lines Sig1 to Sign and the operation 451 of sequentially supplying the conduction voltage Vcom as a drive signal to each of the drive lines G1 to Gm and reading out signals from each corresponding pixel PIX. One FPN image data can be obtained by performing operations 451-1 to 451-$m$ with respect to all the rows set as the range of obtaining a radiation image. In the operation of obtaining FPN image data, the operation 461 as a readout operation may be repeated a plurality of times. For example, each of operations 461-1 to 461-$m$+1 is performed a plurality of times such that the operation 461-1 is performed a plurality of times, the operation 451-1 is then performed, and the operation 461-2 is performed a plurality of times.

Figure 5:
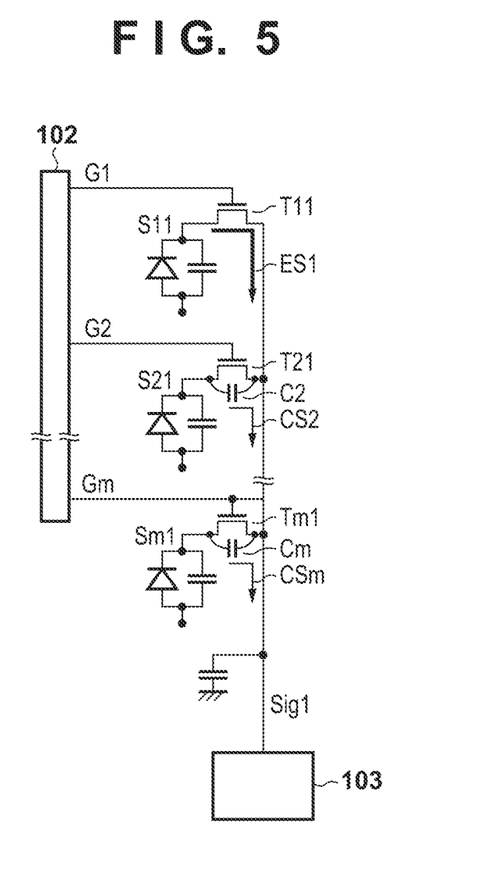
FIG. 5 is a circuit diagram for explaining a crosstalk signal in the radiation imaging apparatus in FIG. 1.
Figure 8A:
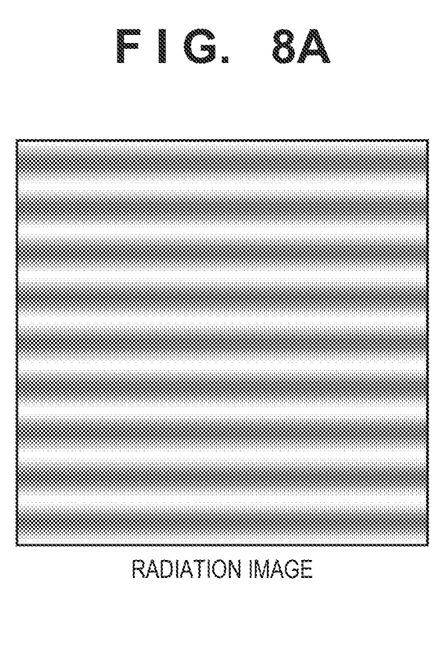
FIGS. 8A and 8B are views for explaining artifacts in the radiation imaging apparatus in FIG. 1.
Figure 8B:
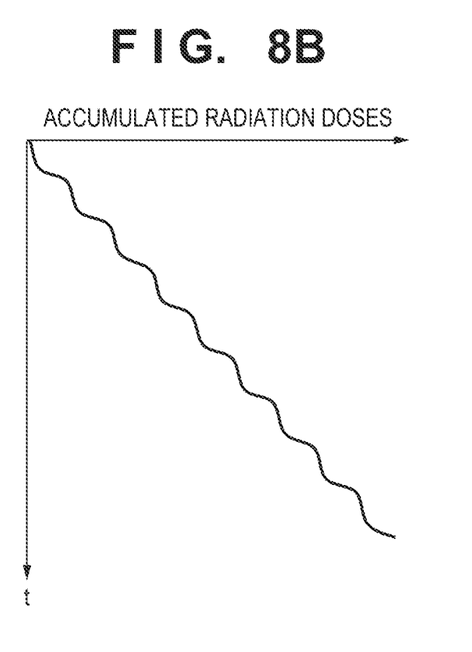

The effect of the operation 411 in a readout operation will be described next. The principle of occurrence of artifacts suppressed by correction using signals read out by the operation 411 will be described with reference to FIGS. 5 and 8. For the sake of simplicity, FIG. 5 shows the pixels PIX in one column which are connected to one signal line Sig (the signal line Sig1 in the case shown in FIG. 5). However, similar phenomena can occur in other columns.

FIG. 5 shows a case in which the switch element T11 connected to the drive line G1 is rendered conductive by the drive circuit 102 during irradiation with radiation. When the switch element T11 is rendered conductive during irradiation with radiation, the readout circuit 103 reads out a signal ES1 corresponding to the charge generated in a conversion element S11 by irradiation with radiation through the signal line Sig1. At this time, since the drive circuit 102 supplies the non-conduction voltage Vss to the drive lines G2 to Gm, switch elements T21 to Tm1 in other rows are not set in the conduction state. However, due to irradiation with radiation, crosstalk signals CS2 to CSm are read out by the readout circuit 103 while being superimposed on the signal line Sig1 through parasitic capacitors C2 to Cm in the respective pixels PIX.

As described above, one image data can be obtained by sequentially rendering the switch elements T from the first row to the end row conductive and outputting signals from the respective pixels PIX to the readout circuit 103. FIGS. 8A and 8B show a graph indicating accumulated radiation doses when irradiation with radiation is not stable in an imaging operation of reading out signals during irradiation with radiation and an example of a radiation image based on the image data obtained at this time. Assume that when a readout operation is executed during irradiation with radiation, radiation is not stable, and the irradiation dose of radiation fluctuates, as shown in FIG. 8B. In this case, a crosstalk signal CS from other than the switch elements T rendered conductive changes due to the fluctuations of irradiation with radiation. Due to the influence of a temporal change in the crosstalk signal CS, striped artifacts like those shown in FIG. 8A appear in the radiation image based on obtained image data.

Figure 9:
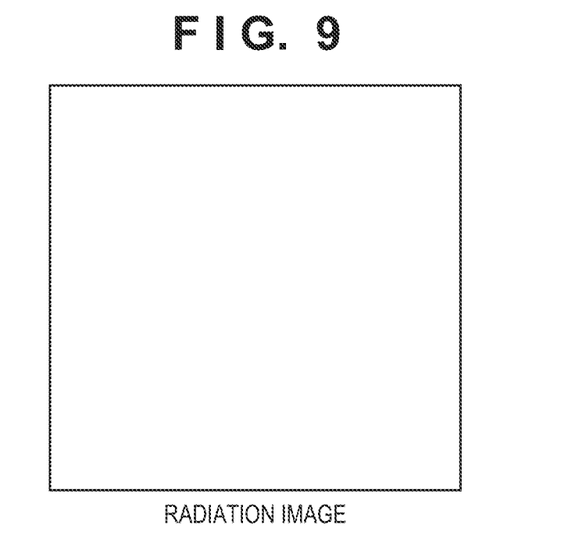
FIG. 9 is a view for explaining the correction of artifacts in the radiation imaging apparatus in FIG. 1.

A correction method according to this embodiment will be described next with reference to FIGS. 4 and 6A to 6C. The correction method according to the embodiment can correct striped artifacts like those shown in FIG. 8A, thereby obtaining a radiation image with striped artifacts being suppressed as shown in FIG. 9.

Figure 4:
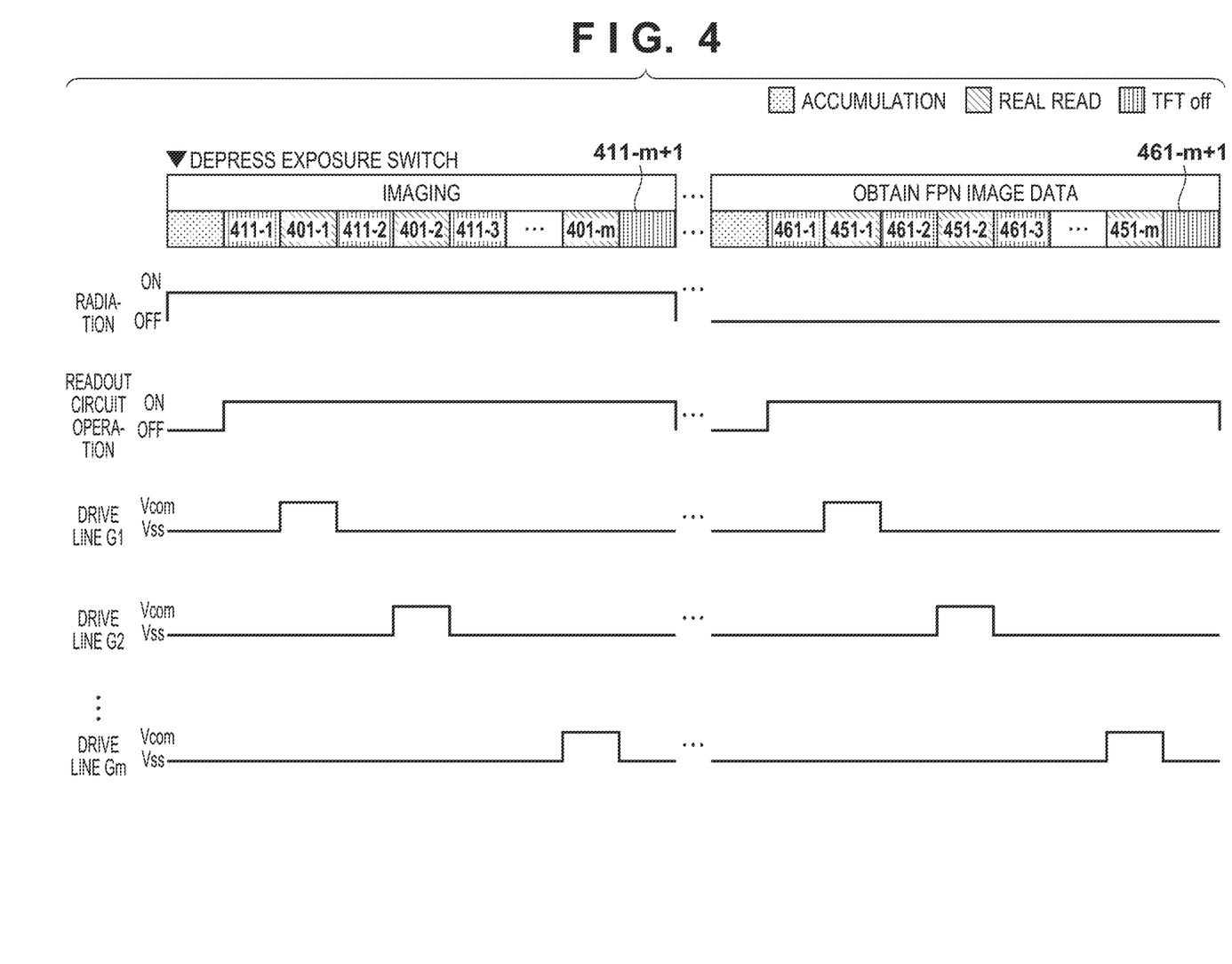
FIG. 4 is a drive timing chart of the radiation imaging apparatus in FIG. 1.
Figure 6A:
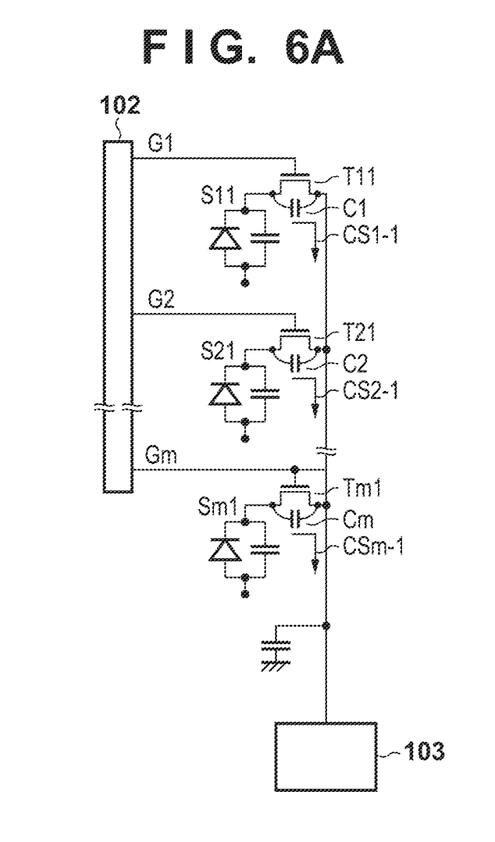
FIGS. 6A to 6C are circuit diagrams for explaining a crosstalk signal in the radiation imaging apparatus in FIG. 1.
Figure 6B:
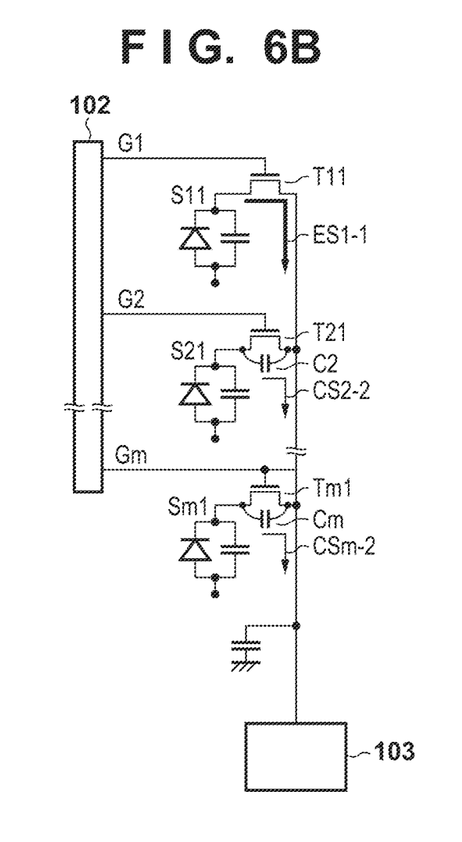
Figure 6C:
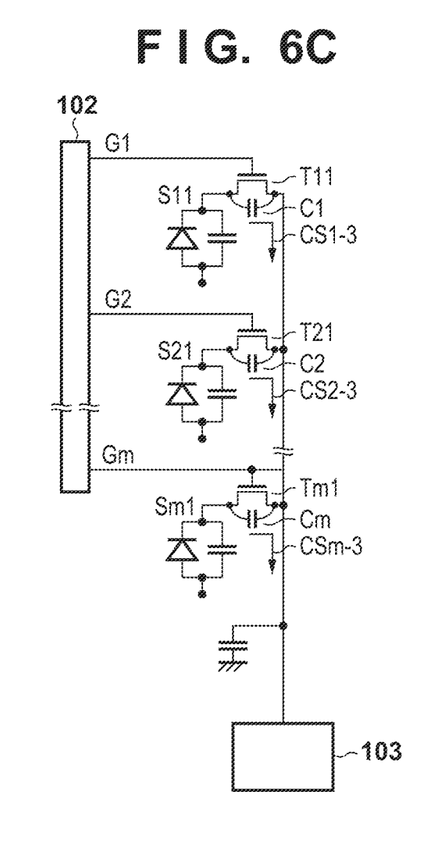

FIG. 6A shows a signal flowing in the signal line Sig1 in the operation 411-1 shown in FIG. 4. Likewise, FIG. 6B shows a current flowing in the signal line Sig1 in the operation 401-1, and FIG. 6C shows a current flowing in the signal line Sig1 in the operation 411-2.

In the operation 411-1, the switch element T is set in the non-conduction state by the drive circuit 102 during irradiation with radiation. That is, although no signal is supplied from any of the plurality of pixels PIX to the signal line Sig1, crosstalk signals CS1-1 to CSm-1 are output to the readout circuit 103 via the signal line Sig1 due to irradiation with radiation.

In the operation 401-1, the drive circuit 102 supplies the conduction voltage Vcom to the drive line G1 during irradiation with radiation to render the switch element T11 connected to the drive line G1 conductive. When the switch element T11 is rendered conductive during irradiation with radiation, a signal ES1-1 corresponding to the charge generated in the conversion element S11 by irradiation with radiation is output to the readout circuit 103 via the signal line Sig1. At this time, although the switch elements T21 to Tm1 are not set in the conduction state, the crosstalk signals CS2-2 to CSm-2 are superimposed on the signal ES1-1 due to irradiation with radiation.

As in the operation 411-1, in the operation 411-2 following the operation 401-1, crosstalk signals CS1 to CSm-3 are obtained.

In this embodiment, the signal processor 105 corrects the signal value of the signal read out in the operation 401-1 by using the signal values of the signals read out in the operations 411-1 and 411-2. In this case, assume that the signal value of the signal read out in the operation 401-1 is a signal value 402A, and the signal values of the signals read out in the operations 411-1 and 411-2 are respectively signal values 412A and 412B. In this case, for example, correction like that indicated by equation (1) given below is executed.

$$(\text{signal value } 402A) - \{(\text{signal value } 412A) + (\text{signal value } 412B)\}/2 = \quad (1)$$

$$\{(ES1-1) + (CS2-2) + \cdots + (CSm-2)\} - [\{(CS1-1) + (CS2-1) + \cdots + (CSm-1) + (CS1-3) + (CS2-3) + \cdots + (CSm-3)\}/2] = (ES1-1) - (CS1)$$

$$\text{where } (CS1) = \{(CS1-1) + (CS1-3)\}/2.$$

In this manner, the signal value read out by the operation 401-1 during irradiation with radiation is corrected by using the average value of the signal values obtained upon setting all the switch elements T in the non-conduction state at timings before and after the read signal value. This can suppress the influence of the crosstalk signals CS and obtain a radiation image with artifacts being suppressed as shown in FIG. 9 even when the irradiation dose of radiation during irradiation with radiation fluctuates.

The above has described the case in which the signal processor 105 corrects the signal value read out by one time of the operation 401 by using the plurality of signal values respectively read out by a plurality of times of the operation 411. More specifically, the signal processor 105 corrects the signal value read out by the operation 401-1 by using the signal values read out by one each of the operations 411-1 and 411-2 performed before and after the one time of the operation 401-1. That is, the signal processor 105 corrects the signal value read out by the operation 401 using the plurality of signal values read out by the one or more times of the operation 411 performed before and after the one time of the operation 401. However, this is not exhaustive. For example, the signal value of the signal read out by the operation 401-1 may be corrected by the signal value of the signals read out by any one of the operation 411-1 and the operation 411-2.

In addition, for example, the signal processor 105 may generate a correction value corresponding to the plurality of signal values read out by a plurality of times of the operation 411 and correct the signal value read out by the one time of the operation 401 using the correction value. At this time, the signal processor may generate a correction value by assigning weights to the plurality of signal values read out by a plurality of times of the operation 411 in accordance with the timings at which the operation 411 has been performed a plurality of times and the operation 401 as a correction target has been performed once. This case will be described with reference to FIG. 7.

Figure 7:
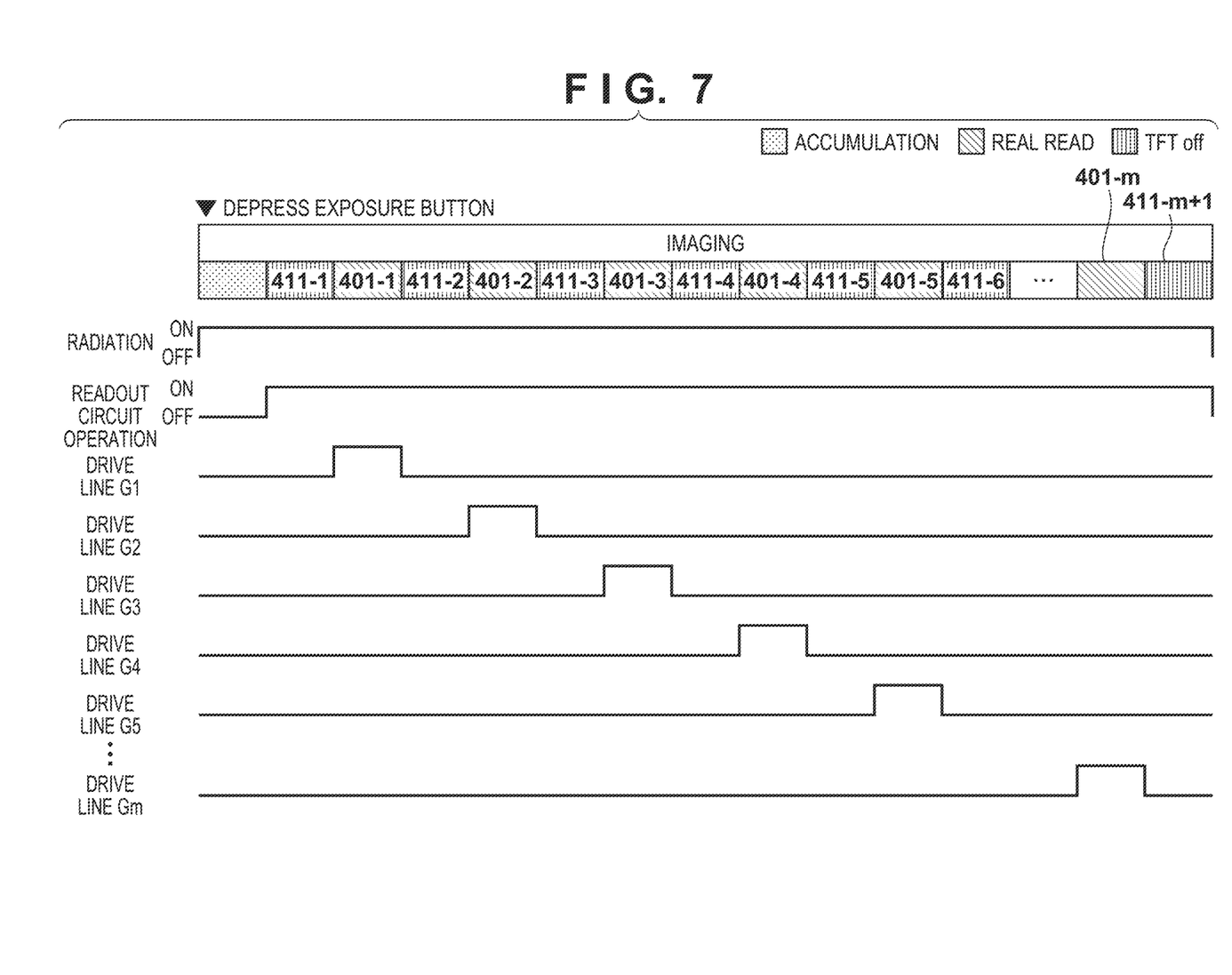
FIG. 7 is a drive timing chart of the radiation imaging apparatus in FIG. 1.

In this case, assume that the signal values of the signals read out by the operations 401-1 to 401-5 are signal values 402A to 402E, and the signal values of the signals read out by the operations 411-1 to 411-6 are signal values 412A to 412F. At this time, for example, the signal value 402C of the signal obtained by the operation 401-3 may be corrected according to equation (2) given below.

corrected signal value=(signal value 402C)−[{(signal value 412A)/4+(signal value 412B)/2+(signal value 412C)+(signal value 412D)+(signal value 412E)/2+(signal value 412F)/4}/3.5]   (2)

In equation (2), the portion enclosed by the square brackets "[ ]" is a correction value. In addition, for example, the signal value 402C of the signal obtained by the operation 401-3 may be corrected according to equation (3) given below.

corrected signal value=(signal value 402C)−[{(signal value 412B)/2+(signal value 412C)+(signal value 412D)+(signal value 412E)/2}/3]   (3)

The above has described the cases in which the number of signal values 412 of the signals read out by the operation 411, which are used for the correction of a signal value 402 of the signal read out by one time of the operation 401 is 1, 2, 4, and 6. However, this is not exhaustive, and the signal value 402 may be corrected by using an appropriate number of signal values 412. This can suppress striped artifacts appearing in a radiation image even when irradiation with radiation fluctuates in a readout operation during irradiation with radiation.

The above has described the case in which the readout circuit 103 alternately repeats the operation 401 and the operation 411 during irradiation with radiation. However, this is not exhaustive. For example, the readout circuit 103 may alternately repeat the operation 411 twice or more and the operation 401 once during irradiation with radiation. In this case, the signal processor 105 may correct the signal value 402 of the signal obtained by each operation 401 by using the signal values 412 of the signals obtained by the different operations 411. In addition, in this case, the signal processor 105 may correct the signal values 402 of the signals obtained by the different operations 401 by partly using the signal value 412 of the signal obtained by the same operation 411. At this time, as described above, a weight may be assigned to the signal value 412 at the time of generating a correction value according to the timings at which the operation 401 and the operation 411 are performed.

In obtaining FPN image data following an imaging operation, similar correction may be performed for the signals output from the pixels PIX arranged in each row. The signal processor 105 generates one image data based on the signal value 402 read out a signal from each of the plurality of pixels PIX set for the generation of a radiation image once and corrected by using the signal value 412. The signal processor 105 then generates one FPN image data based on the signal value of the signal read out a signal from each of the plurality of pixels PIX set for the generation of a radiation image once by the operation 451 and corrected by using the signal value of the signal obtained by the operation 461. A radiation image from which radiation fluctuation components and dark current components are removed can be obtained by subtracting the corrected FPN image data from the corrected image data.

The above has mainly described the case in which a signal is read out from each of the pixels PIX once. However, the effect of the operation described above is not limited to the case in which a signal is read out from each of the pixels PIX once. For example, in fluoroscopic imaging for capturing a moving image, the above driving and correction may be performed during irradiation with radiation. That is, the operation of reading out a signal from each pixel PIX once may be repeated. For example, an operation 411-$m$+1 following the operation 401-$m$ shown in FIG. 4 is an operation corresponding to the operation 411-1 shown in FIG. 4, and the operations 401 and 411 are repeated. As described above, the above operation can be applied to both still imaging and fluoroscopic imaging.

For example, the signal processor 105 may perform the above driving and correction when generating data for one radiation image based on one or more image data. In generating data for one radiation image based on a plurality of image data, for example, the operation 411-$m$+1 following the operation 401-$m$ shown in FIG. 4 is an operation corresponding to the operation 411-1 shown in FIG. 4, and the operations 401 and 411 can be repeated. In generating one radiation image, for example, a plurality of image data obtained by a plurality of times of imaging may be averaged. This makes it possible to divide the operation of reading out signals into a plurality of parts in performing imaging with high radiation dose so as to saturate the capacitance of each pixel PIX. At the same time, averaging striped artifacts can be further reduced by averaging. In addition, in irradiation with radiation over a long time as in non-destructive inspection, signals may be read out during irradiation with radiation.

Although the above has described the generation of a radiation image, the above driving and correction are not limited to the case in which signals used for the generation of a radiation image are obtained. For example, the above driving and correction may be performed at the time of obtaining image data for gain correction by uniform irradiation with radiation without an object. In this case, obtained image data may be corrected by using the above FPN image data, and the resultant data may be used as image data for gain correction. For example, image data for gain correction can be obtained by subtracting FPN image data from obtained image data.

Although the above has described the case in which the signal processor 105 processes the signals output from a plurality of pixels, this is not exhaustive. For example, the radiation imaging apparatus 100 may transfer the signals obtained by the operations 401 and 411 to the control computer 110, and the control computer 110 may perform correction processing like that described above. Correction processing can be performed by, for example, the processor of the control computer 110.

In addition, for example, the radiation imaging apparatus 100 transfers the signal value 402 read out a signal from each of the plurality of pixels PIX set for the generation of a radiation image once and corrected by using the signal value 412 by the signal processor 105 to the control computer 110 via the communication unit 107. The processor of the control computer 110 may generate one image data based on the signal value 402 corrected by using the signal value 412. In addition, for example, the signal processor 105 of the radiation imaging apparatus 100 may generate image data or FPN-corrected image data by performing the above correction and the like and transfer the generated image data to the control computer 110. In these cases, the processor of the control computer 110 may generate data for one radiation image based on one or a plurality of image data obtained by one or a plurality of times of imaging.

The above driving and correction make it possible to obtain a radiation image with suppressed artifacts. The radiation imaging apparatus 100 that performs such driving and correction processing can be used for capturing a medical radiation image and capturing a radiation image for non-destructive inspection. Assume that in non-destructive inspection or the like, when imaging is performed with a long time of irradiation with radiation (a long accumulation time), the irradiation dose of radiation fluctuates during imaging. Even in this case, a radiation image with high quality can be obtained by applying the above embodiment.

For example, the control computer 110 obtains image data for the generation of a radiation image and performs synchronization control between the radiation controller 130 and the radiation imaging apparatus 100. However, this is not exhaustive. The control computer 110 may not perform synchronization control between the radiation controller 130 and the radiation imaging apparatus 100.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-103906, filed Jun. 28, 2022, which is hereby incorporated by reference herein in its entirety.

What is claimed is:

1. A radiation imaging apparatus comprising a plurality of pixels each including a conversion element configured to convert radiation into signal charge and a switch element configured to output an electrical signal corresponding to the signal charge, a signal line to which signals are supplied from the plurality of pixels, a readout circuit configured to read out a signal supplied to the signal line, and a signal processor configured to process a signal read out by the readout circuit, wherein the readout circuit is configured to perform, during irradiation with radiation, a first operation of reading out a signal while the switch element of each of the plurality of pixels is in a non-conduction state and a second operation of reading out a signal while the switch element of a predetermined pixel of the plurality of pixels is in a conduction state, the signal processor is configured to correct a second signal value of a signal read out by the second operation by using a first signal value of a signal read out by the first operation, the signal processor is configured to generate one image data based on the second signal value read out a signal from each of the plurality of pixels once and corrected by using the first signal value, the readout circuit is configured to further perform, during non-irradiation with radiation, a third operation of reading out a signal from each of the plurality of pixels and a fourth operation of reading out a signal while the switch element of each of the plurality of pixels is in a non-conduction state, and the signal processor is configured to generate correction data from signals read out by the third operation and the fourth operation and to correct the image data by using the correction data.

2. The apparatus according to claim 1, wherein the readout circuit is configured to alternately repeat the first operation and the second operation during irradiation with radiation.

3. The apparatus according to claim 1, wherein the readout circuit is configured to alternately repeat the first operation not less than twice and the second operation once during irradiation with radiation.

4. The apparatus according to claim 1, wherein the signal processor is configured to correct the second signal value read out by one time of the second operation using the plurality of first signal values read out by a plurality of times of the first operation.

5. The apparatus according to claim 4, wherein the signal processor is configured to generate a correction value corresponding to the plurality of first signal values read out by a plurality of times of the first operation and to correct the second signal value read out by one time of the second operation using the correction value.

6. The apparatus according to claim 1, wherein the signal processor is configured to correct the second signal value read out by the second operation by using the plurality of first signal values read out by the first operation performed not less than once before and after one time of the second operation.

7. The apparatus according to claim 1, wherein the plurality of pixels are arranged to form rows and columns, a plurality of signal lines including the signal line are arranged in correspondence with the respective columns of the plurality of pixels, and in the second operation, signals from pixels, of the plurality of pixels, which are arranged in one row are respectively supplied to corresponding signal lines of the plurality of signal lines.

8. The apparatus according to claim 1, further comprising a drive circuit, wherein the switch element includes two main terminals and a control terminal, one main terminal of the two main terminals is connected to the conversion element, another main terminal of the two main terminals is connected the signal line, and the switch element is switched to a conduction state or a non-conduction state by supplying a control signal for controlling a conduction state between the two main terminals from the drive circuit to the control terminal.

9. The apparatus according to claim 1, wherein image data obtained without an object by using the correction data is corrected, and image data for gain correction is obtained.

10. The apparatus according to claim 1, wherein the signal processor is configured to generate data for one radiation image based on a plurality of image data including the image data.

11. A radiation imaging system comprising:

the radiation imaging apparatus according to claim 1; and a processor configured to process a signal output from the radiation imaging apparatus.

12. A control method for a radiation imaging apparatus including a plurality of pixels each including a conversion element configured to convert radiation into signal charge and a switch element configured to output an electrical signal corresponding to the signal charge and a signal line to which signals are supplied from the plurality of pixels, the method comprising:

performing, during irradiation with radiation, a first operation of reading out a signal while the switch element of each of the plurality of pixels is in a non-conduction state and a second operation of reading out a signal while the switch element of a predetermined pixel of the plurality of pixels is in a conduction state, correcting a second signal value of a signal read out by the second operation by using a first signal value of a signal read out by the first operation, generating one image data based on the second signal value read out a signal from each of the plurality of pixels once and corrected by using the first signal value, performing, during non-irradiation with radiation, a third operation of reading out a signal from each of the plurality of pixels and a fourth operation of reading out a signal while the switch element of each of the plurality of pixels is in a non-conduction state, generating correction data from signals read out by the third operation and the fourth operation, and correcting the image data by using the correction data.

13. A non-transitory computer-readable storage medium storing a program for causing a computer to execute the method according to claim 12.

14. A signal processing apparatus that processes a signal output from a radiation imaging apparatus, the radiation imaging apparatus including a plurality of pixels each including a conversion element configured to convert radiation into signal charge and a switch element configured to output an electrical signal corresponding to the signal charge, a signal line to which signals are supplied from the plurality of pixels, and a readout circuit configured to read out a signal supplied to the signal line, wherein the readout circuit is configured to perform, during irradiation with radiation, a first operation of reading out a signal from the signal line while the switch element of each of the plurality of pixels is in a non-conduction state and a second operation of reading out a signal from the signal line while the switch element of a predetermined pixel of the plurality of pixels is in a conduction state, and to output signals read out by the first operation and the second operation, and the signal processing apparatus is configured to obtain the signals read out by the first operation and the second operation and to correct a second signal value of a signal read out by the second operation by using a first signal value of a signal read out by the first operation the signal processing apparatus is configured to generate one image data based on the second signal value read out a signal from each of the plurality of pixels once and corrected by using the first signal value, the readout circuit is configured to further perform, during non-irradiation with radiation, a third operation of reading out a signal from each of the plurality of pixels and a fourth operation of reading out a signal while the switch element of each of the plurality of pixels is in a non-conduction state, and to output signals read out by the third operation and the fourth operation, and the signal processing apparatus is configured to obtain the signals read out by the third operation and the fourth operation, to generate correction data from signals read out by the third operation and the fourth operation, and to correct the image data by using the correction data.

\* \* \* \* \*